United States Patent

[11] 3,627,297

[72] Inventor Jan Gaydecki
 Leicester, England
[21] Appl. No. 10,569
[22] Filed Feb. 11, 1970
[45] Patented Dec. 14, 1971
[73] Assignee The Dunlop Company Limited
 London, England

[54] FLUID SPRINGS
 6 Claims, 2 Drawing Figs.
[52] U.S. Cl. .................................................. 267/118,
 267/65
[51] Int. Cl. ...................................................... F16f 5/00
[50] Field of Search ........................................... 267/118,
 121, 65, 65 B

[56] References Cited
 UNITED STATES PATENTS
 2,933,308  4/1960  McGavern, Jr. et al. ..... 267/65 B
 3,033,558  5/1962  Slemmons et al. ............ 267/65 B Primary Examiner—James B. Marbert
Attorney—Jeffers and Young ABSTRACT: A spring assembly comprising a series arrangement of two rolling diaphragm fluid springs, each spring being of the kind in which a piston operates in a cylinder against a flexible diaphragm, the diaphragm and cylinder together enclosing a fluidtight space. The springs are arranged so that the cylinder of one spring constitutes the piston of the other spring, of which the following is a specification.

FLUID SPRINGS

This invention comprises improvements in fluid springs e.g. air spring, and concerns fluid springs of the rolling diaphragm type.

In this type of spring a piston operates in a cylinder against a flexible diaphragm, the diaphragm and the cylinder together enclosing a fluidtight space. The diaphragm rolls between opposing walls of the piston and cylinder during relative movements thereof such movements changing the volume of said fluidtight space.

The opposing walls may be cylindrical whereby the effective area of the spring remains constant with deflection. In stroke variable area springs the opposing walls are inclined one with respect to the other.

According to a further aspect of the present invention a spring assembly comprises a series arrangement of rolling diaphragm fluid springs of the type described above in which at least two of the springs are arranged with the cylinder of one spring constituting the piston of the other spring.

Figure 1:
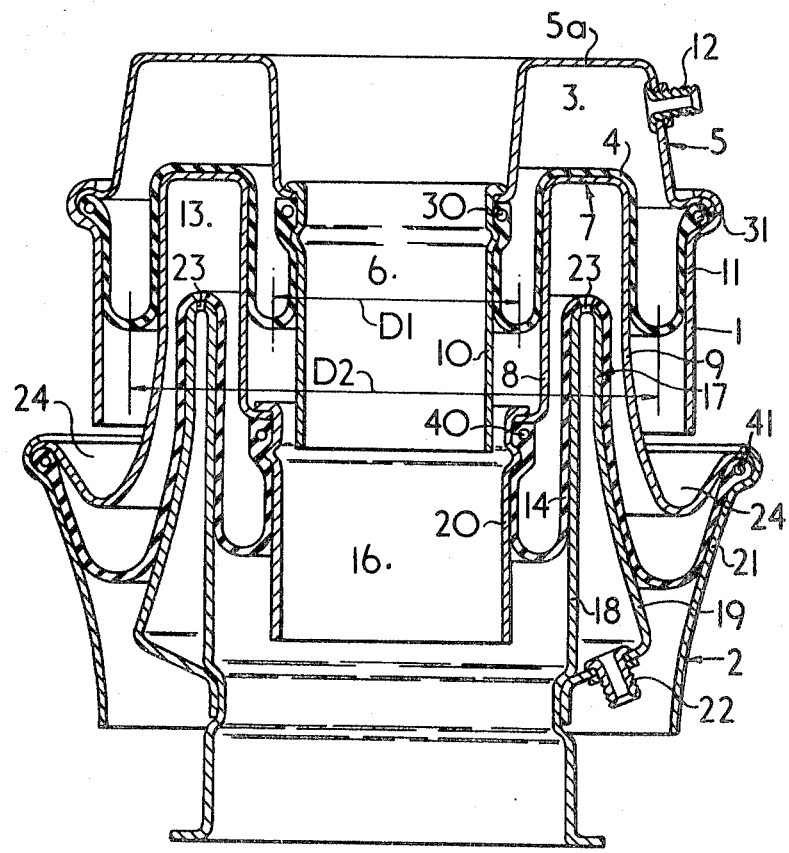
Figure 2:
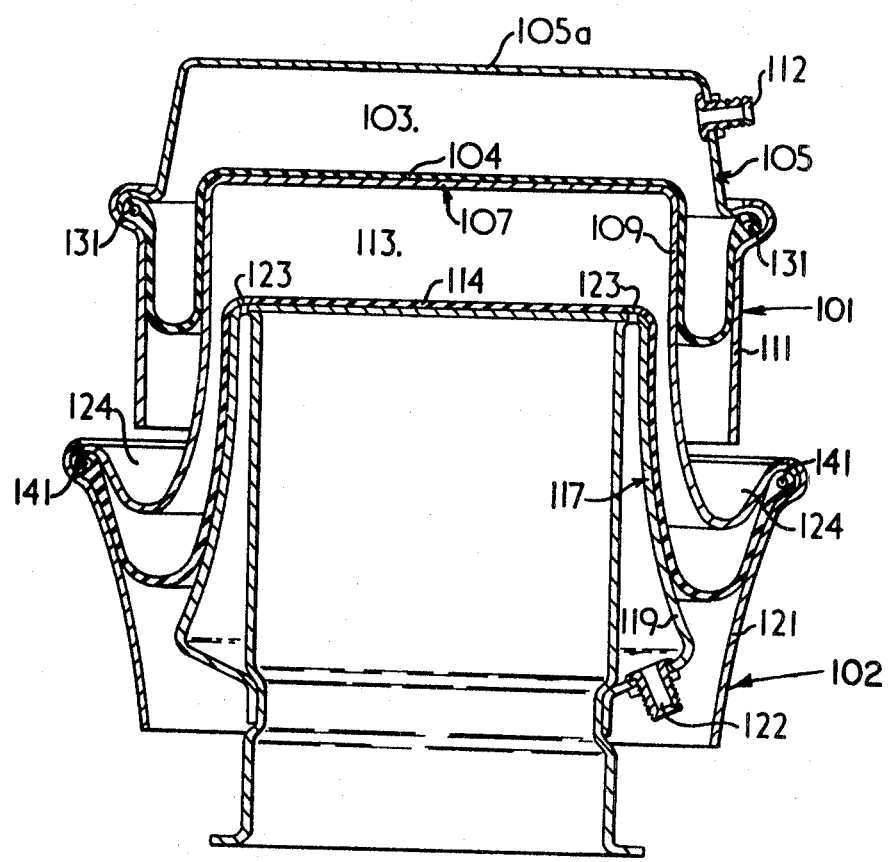

The present invention will now be described with reference to the accompanying drawings of which:

FIGS. 1 and 2 show cross-sectional views of examples of air spring assemblies in accordance with the present invention.

A spring assembly in accordance with the present invention is shown in FIG. 1. The assembly comprises an upper spring 1 and a lower spring 2, both rolling diaphragm springs of the kind disclosed in our copending application Ser. No. 08,662/69, arranged in series.

The upper spring 1 comprises an annular fluidtight space 3 enclosed by an annular rolling diaphragm 4 and an annular cylinder 5, the spring presenting a central throughway 6.

A piston portion 7, also of annular form, has inner and outer walls 8 and 9. During deflection of the spring the diaphragm 4 rolls between inner and outer walls 10 and 11 of the skirt portions of the cylinder 5 and inner and outer walls 8 and 9 of the piston 7. The opposing pairs of walls 8,10 and 9,11 are cylindrical in form thus ensuring that the effective area of the diaphragm remains constant with deflection.

The effective area of the diaphragm is that of a flat annular ring of inner mean diameter $D_1$ and outer mean diameter $D_2$. The effective load $L$ due to an internal pressure $P$ in the space 3 is $L=P(D_2^2-D_1^2)\pi/4$. Thus a constant load/deflection characteristic is provided.

A pipe connection 12 is provided in the outer wall 11 of the cylinder 5. When employing this type of spring in a vehicle suspension system the connection is normally connected to a source of fluid pressure (not shown) which is controlled by a suspension levelling valve (not shown).

The inner and outer peripheries 30 and 31 of the diaphragm 4 are beaded and clamped between cylinder wall portions 10 and 11 and head portion 5a. The diaphragm may alternatively be formed in two annular portions (not shown) a smaller mean diameter inner portion and a larger mean diameter outer portion, the inner portion being secured between the inner wall 10 of the cylinder and the piston 7 and the outer portion being secured between the outer wall 11 of the cylinder and the piston.

The piston portion 7 of upper spring 1 also functions as the cylinder for the lower spring 2. This allows an extremely compact series arrangement to be produced.

The lower spring 2 comprises a fluidtight space 13 enclosed by an annular rolling diaphragm 14 and the cylinder portion 7, the spring presenting a central throughway 16.

A piston portion 17, also of annular form, has inner and outer walls 18 and 19. The diaphragm 14 rolls between portions 20 and 21 of the inner and outer walls of the cylinder 7 and the inner and outer walls 18 and 19 of the piston 17 during deflection of the spring. The opposing walls 18,20 are cylindrical but the opposing walls 19 and 21 diverge to give a stroke variable area spring the effective area of which increases with deflection.

The inner and outer peripheries 40 and 41 of the diaphragm 14 are beaded and clamped between cylinder wall portions 20 and 21 and the walls of the trough-shaped portion 24. The diaphragm 14 may be formed in two annular portions and secured in a similar manner to that previously described above with reference to diaphragm 4.

A pipe connection 22 is disposed in the outer wall 19 of the piston 17 within the outer wall portion 21 of the cylinder 7. The connection communicates with the space 13 through aligned holes 23 in the crown of the piston 17 and in the diaphragm 14. With this arrangement the connection 22 does not obstruct the path of either of the cylinders 5 and 7.

In order to ensure that the series arrangement is as compact as possible the cylinder portion 7 of the lower spring 2 is provided with a trough-shaped region 24 which receives the lower end of the outer wall 11 of the cylinder 5 of the upper spring 1 upon full deflection of the spring arrangement.

In vehicle suspension systems where a can hydraulic damper is concentric with a coil spring it would not be possible to fit a conventional rolling diaphragm air spring unless an alternative position is found for the damper or an alternative means of damping is introduced. The air spring described above is suitable for such applications as the hydraulic damper can operate freely in the central throughway 6,16 without physical contact with the diaphragm. This is a distinct advantage because heat generated in the damper can dissipate freely.

The series arrangement of springs shown in FIG. 2 comprises an upper spring 101 and a lower spring 102 both of conventional form. In FIG. 2 parts corresponding with, or equivalent to, parts already described with reference to FIG. 1 are indicated by corresponding reference numerals raised by 100.

The upper spring 101 is of constant effective area and the lower spring 102 has an effective area which increases with deflection. The pipe line connection 122 for the lower spring is disposed on the wall of the piston 117 and communicates with a hollow annular portion thereof leading to the holes 123 previously described, and through these holes with the cylinder space 113 of the lower spring. Thus the connection 122 does not obstruct the path of either of the cylinders 105 and 107.

The cylinder 107 of the lower spring has a trough 124 which receives the lower end of the outer wall 111 of the upper cylinder upon full deflection of the spring arrangement.

Springs in accordance with the present invention are particularly suitable for use as rear spring units in a self-levelling vehicle fluid suspension system as described in copending application Ser. No. 431/66.

In this suspension system each of the rear spring units comprises a primary and a secondary spring arranged in series. The primary spring, which may be interconnected with the remaining primary springs of the system, primarily controls the periodicity of the system while the secondary spring, in conjunction with a levelling valve, is primarily arranged to maintain the desired height and altitude of the vehicle body with respect to the road regardless of changes of load or distribution of load of the vehicle.

Having now described my invention, what I claim is:

1. A spring assembly comprising a series arrangement of rolling diaphragm fluid springs, at least two of said springs being constructed in telescoping relation and wherein the cylinder portion of one spring constitutes the piston of the second spring.

2. The spring assembly in accordance with claim 1, wherein each spring assembly includes a cylinder, a piston, and a diaphragm, each of said cylinder-piston-diaphragm combinations being of annular form to define an axially extending central throughway in the entirety of the spring assembly.

3. The spring assembly in accordance with claim 2, wherein the diaphragm of one spring includes two annular portions consisting of a larger mean diameter portion and a relatively smaller mean diameter portion, said outer portion being secured between the outer wall of an annular cylinder portion of said spring assembly and its coacting confronting piston surface and the inner portion of said diaphragm being secured between the inner wall of said annular cylinder and its coacting confronting piston surface.

4. The spring assembly according to claim 1, wherein the opposing walls of the cylinder-and-piston combination of at least one of said springs is of cylindrical construction whereby the effective area of the spring remains substantially constant throughout the entire stroke of the associated piston.

5. The spring assembly in accordance with claim 1, wherein the opposing walls of the cylinder-and-piston combination of at least one of said springs is divergent whereby the effective area of the springs varies in accordance with the piston stroke.

6. The spring assembly in accordance with claim 1 wherein said diaphragms have beaded edges and means for clamping said beaded edges to a respective cylinder-and-piston.

* * * * *

UNITED STATES PATENT OFFICE
CERTIFICATE OF CORRECTION

Patent No. 3,627,297          Dated December 14, 1971

Inventor(s) Jay Gaydecki

It is certified that error appears in the above-identified patent and that said Letters Patent are hereby corrected as shown below:

Column 2, line 16, delete "can" and insert -- telescopic --.

Signed and sealed this 16th day of May 1972.

(SEAL)
Attest:

EDWARD M. FLETCHER, JR.
Attesting Officer

ROBERT GOTTSCHALK
Commissioner of Patents